United States Patent [19]

Patel

[11] Patent Number: 5,811,472
[45] Date of Patent: Sep. 22, 1998

[54] RADIATION CURABLE COMPOSITIONS HAVING IMPROVED MOISTURE RESISTANCE

[75] Inventor: Gautam Ambalal Patel, Clifton Park, N.Y.

[73] Assignee: General Electric Company, Schenectady, N.Y.

[21] Appl. No.: 684,666

[22] Filed: Jul. 22, 1996

[51] Int. Cl.⁶ .................................................. C08F 2/46
[52] U.S. Cl. ................................. 522/14; 522/18; 522/99
[58] Field of Search ................................. 522/14, 64, 75, 522/78, 83, 84, 91, 99, 172, 18

[56] References Cited

U.S. PATENT DOCUMENTS

| | | | |
|---|---|---|---|
| 4,455,205 | 6/1984 | Olson et al. | 522/44 |
| 4,478,876 | 10/1984 | Chung | 427/515 |
| 4,486,504 | 12/1984 | Chung | 428/412 |
| 4,491,508 | 1/1985 | Olson et al. | 522/44 |
| 4,863,802 | 9/1989 | Moore et al. | 428/412 |
| 5,162,390 | 11/1992 | Tilley et al. | 522/64 |
| 5,214,085 | 5/1993 | Patel et al. | 524/102 |
| 5,242,719 | 9/1993 | Medford et al. | 427/515 |
| 5,318,850 | 6/1994 | Pickett et al. | 428/412 |
| 5,468,789 | 11/1995 | Lewis et al. | 524/99 |

FOREIGN PATENT DOCUMENTS 406041467A 2/1994 Japan .

OTHER PUBLICATIONS

"Photocrosslinking of Silicones. VI.* Photocrosslinking Kinetics of Silicone Acrylates and Methacrylates" by U. Muller, S. Jockusch and H–J Timpe,Journal of Polymer Science: Part A; Polymer Chemistry, vol. 30–2755–2764 (1992).

*Primary Examiner*—D. S. Nakarani
*Attorney, Agent, or Firm*—Noreen C. Johnson; Douglas E. Stoner

[57] ABSTRACT

Radiation curable compositions having improved moisture resistance with at least one acrylic monomer, silica, at least one initiator for ultraviolet radiation-induced curing of said composition, an effective amount of at least one ultraviolet light absorber, an effective amount of at least one hindered amine light stabilizer to inhibit ultraviolet radiation-induced degradation of said composition, and an effective amount of at least one acrylic functional siloxane additive to provide a surface energy of said composition having a contact angle of water greater than about 80°. When employed as coatings for resinous articles, such as polycarbonate, and cured, said compositions provide improved weatherability and moisture resistance.

11 Claims, No Drawings

RADIATION CURABLE COMPOSITIONS HAVING IMPROVED MOISTURE RESISTANCE

FIELD OF THE INVENTION

The present invention relates to radiation curable hardcoat compositions which are useful for imparting abrasion resistance, weatherability, and improved moisture resistance to thermoplastic substrates when applied and cured thereon. More particularly, this invention relates to certain weather and abrasion resistant thermoplastic composites which comprise a thermoplastic substrate such as a polycarbonate film or sheet or molded parts, and an ultraviolet cured acrylic coating.

BACKGROUND OF THE INVENTION

The use of resinous film or sheet material such as polycarbonates and poly(methyl methacrylate) is known in the art. Many of these materials are transparent and are conventionally employed as replacements for glass. However, such materials easily scratch and abrade, resulting in possible decrease in transparency.

As a result, various methods to improve the abrasion resistance of resinous film or sheet material have been developed. These include so-called ""silicone hardcoats"", which are thermally cured, and silicon compound-containing compositions which are capable of being cured by radiation, such as ultraviolet (UV) radiation (herein also referred to as ultraviolet cured hardcoat compositions, or ultraviolet radiation-curable coatings). Ultraviolet light curable optically clear and abrasion resistant coating compositions are dispersions of hard colloidal silica filler in acrylic monomers which can be cured using a free radical type of photo initiator. The ultraviolet radiation-cured coating compositions are advantageous because of their short curing times.

Many ultraviolet radiation-curable abrasion-resistant coatings are known in the art. U.S. Pat. No. 4,455,205 discloses compositions comprising a silyl acrylate, aqueous colloidal silica, a photoinitiator and optionally a polyfunctional acrylate. Other materials which may be present include absorbers of ultraviolet radiation, employed as stabilizers, and hindered amines.

Other types of ultraviolet radiation-curable coating compositions are disclosed in U.S. Pat. No. 4,486,504, which contains colloidal silica, a silyl acrylate, a polyfunctional acrylate and a photoinitiator. U.S. Pat. No. 4,491,508 contains colloidal silica, a silyl acrylate, a polyfunctional acrylate and a photoinitiator. Both of these patents also disclose the optional presence of ultraviolet stabilizers or compounds convertible thereto. U.S. Pat. No. 4,863,802 discloses coating compositions of essentially the same types further containing an ultraviolet radiation-absorbing amount of a dimeric benzotriazole compound as a stabilizer. Similar compositions employing acylphosphorous compounds such as 2,4,6-trimethylbenzoyldiphenylphosphine oxide are disclosed in U.S. Pat. No. 5,162,390, which also discloses the use of benzotriazoles and benzophenones as ultraviolet stabilizers.

Recently, it is becoming more and more common for resinous film and sheet materials such as polycarbonate to be employed outdoors. It is thus important to impart weatherability properties on the ultraviolet radiation-curable coatings. Weather resistant coating systems can be prepared by incorporating various ultraviolet absorbers and hindered amine light stabilizers. However, prolonged exposure to sunlight, moisture and thermal cycling conditions can cause yellowing, delamination and formation of microcracks, decreasing transparency. These conditions are often noted in varying degrees in the compositions disclosed in the aforementioned patents, even when one of the properties mentioned is improved weatherability.

Moisture resistance and durability of ultraviolet radiation-curable coating compositions is related to the surface energy of the coating. The surface energy controls a variety of important moisture resistant properties such as wettability, water repellency, soil resistance, anti-graffiti property, slip or lubricity, coefficient of friction and mar or scratch resistance of the coatings. An ultraviolet radiation-curable coating having low surface energy on a thermoplastic substrate such as polycarbonate is highly desirable in many applications to improve moisture resistance. Thus, there is a need for an improved weather resistant hardcoat composition that improves the moisture resistance of the ultraviolet radiation-curable coating on the thermoplastic substrate.

SUMMARY OF THE INVENTION

The present invention fulfills this need by providing the discovery of a class of acrylic functional siloxane compounds which may be incorporated in radiation-curable coating compositions to provide low surface energy coatings which have superior moisture resistance and durability. The improved moisture resistance is demonstrated by low surface energy coatings having contact angles with water greater than about 80°, and preferably greater than about 90°. The resulting radiation curable coating compositions have been found to provide coated thermoplastic articles having superior weatherability resistance while maintaining abrasion resistance generally shown by commercially available ultraviolet cured hardcoat compositions. The invention also provides improved moisture resistant coatings with low surface energy that increase surface lubricity and mar resistance of the coatings.

Thermoplastics such as polycarbonates, polyesters, polymethyl methacrylate and polyvinyls can be used. Other suitable thermoplastics or blends are Noryl, Xenoy, Geloy and Valox available from General Electric Co. Plastic substrates can be with or without pigments.

DESCRIPTION OF THE INVENTION

In one aspect of the invention, there is provided a liquid coating composition comprising (A) at least one acrylic monomer, (B) silica acrylate, (C) at least one initiator for ultraviolet radiation-induced curing of said composition, (D) an effective amount of at least one ultraviolet light absorber, (E) an effective amount of at least one hindered amine light stabilizer to inhibit ultraviolet radiation-induced degradation of said composition, and (F) an effective amount of at least one acrylic functional siloxane additive to provide a surface energy of said composition having a contact angle of water greater than about 80°. In addition, the viscosity of the discovered liquid coating composition may be adjusted by diluting it with either low viscosity monoacrylates or diacrylates as reactive diluents or solvents or both.

Reagent A in the compositions of this invention is at least one acrylic monomer. The term ""acrylic monomer"" generally includes esters and amides of acrylic acid, methacrylic acid and homologs and analogs thereof such as ethylacrylic, phenylacrylic or chloroacrylic acid. The preferred acids are acrylic and methacrylic, with acrylic generally being the most preferred. The acrylic monomers are preferably esters; however, ""acrylate"" as used hereafter includes methacrylates when the corresponding chemical formula so indicates."

Often, at least a portion of the acrylic ester is a silyl acrylate. Suitable silyl acrylates include those of the formula

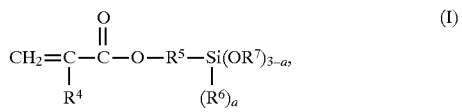

wherein $R^4$ is hydrogen or methyl, $R^5$ is $C_{1-8}$ alkylene, $R^6$ is $C_{1-13}$ alkyl or aryl, $R^7$ is $C_{1-8}$ alkyl and a is from 0 to 3. Especially preferred are acrylates wherein $R^4$ is methyl, $R^5$ is $C_{2-4}$ alkylene and especially trimethylene, $R^7$ is methyl and a is 0.

Reagent A may comprise at least one polyfunctional acrylic monomer. Such monomers include compounds of the formula

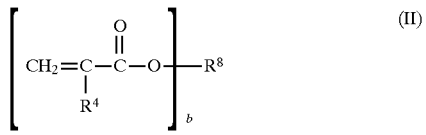

wherein $R^4$ is as previously defined and in this instance is preferably hydrogen, $R^8$ is a polyvalent organic radical and b is an integer from 2 to 8. The $R^8$ radical is most often an aliphatic radical having about 4–20 carbon atoms. Preferably, b is 5–6 and $R^8$ is alkylene, especially unbranched alkylene such as tetramethylene, hexamethylene or octamethylene. Examples of multifunctional acrylic monomers suitable for this invention are dipentaerythritol monohydroxypenta acrylate (DiPePeta, SR-399®, Sartomer Co.), hexafunctional polyurethane acrylate (PU, Ebecryl® 1290, UCB Radcure Inc.), and hexafunctional polyester acrylate (PE, Ebecryl® 830, UBC Radcure Inc.), and dipentaerythritol hexaacrylate.

Reagent B is silyl acrylate modified silica, with silica having an average particle size in the range of about 5–80 nm, corresponding to that of colloidal silica, and especially about 15–30 nm being preferred. Colloidal silica is a dispersion of submicron-sized silica particles in an aqueous or other solvent medium; silica concentrations therein are typically in the range of about 15–50 weight percent. When an aqueous silica dispersion is employed in the preparation of the composition of this invention, hydrolysis of at least a portion of the SiO bonds in the silyl acrylate (when a is less than 3) is possible or even likely. Therefore, the compositions of this invention may include those containing hydrolysis products of said silyl acrylate. An example of colloidal silica is a commercial product than can be used in this invention is FCS-100 manufactured by GE Silicones, which is about 50 weight percent silyl acrylate modified colloidal silica in hexanediol diacrylate monomer. Preparation methods are described in the U.S. Pat. No. 5,468,789, incorporated herein by reference.

Reagent C is at least one initiator for ultraviolet radiation-induced curing (hereinafter sometimes "photoinitiator") of the coating compositions. Many such photo initiators are known in the art, and any are suitable for use according to the present invention. The photoinitiator may be chosen from the types disclosed in the aforementioned patents and in U.S. Pat. Nos. 4,478,876 and 5,318,850. Further examples include: combinations of aromatic ketones such as acetophenone, benzophenone, xanthone benzoin compounds and the like, tertiary amines such as triethanolamine, methyldiethanolamine, and 4-dimethylamineobenzophenone; acylphosphorous compounds, including triorganobenzoyldiarylphosphine oxides, triorganobenzoyldiorgano phosphonates and triorganobenzoyldiarylphosphine sulfides. The acylphosphorous compounds are preferred and 2,4,6-trimethylbenzoyldiphenylphosphine oxide is often especially preferred, which is available as Lucirin®, TPO from BASF Co.

Other suitable photoinitiators are benzoin derivatives (benzoin isopropyl ether), benzil ketals (Irgacure® 651, Ciba Geigy Corp.) diethoxyacetophenone, (Irgacure® 184, Ciba Geigy Corp.), s-substituted α-amino ketones (Irgacure® 907, Ciba Geigy Corp.), and benzoyl oxime derivatives.

Reagent D is an ultraviolet (UV) light stabilizer or absorber of the type described in the aforementioned patents and known in the art, including benzotriazoles and benzophenones. The ultraviolet light stabilizers are present in an amount effective to inhibit ultraviolet degradation of the type leading to microcrack formation, delamination and yellowing, but not effective to substantially inhibit ultraviolet-induced curing of the composition. Examples of UV stabilizers include 2-hydroxy-4-acryloxyethoxy benzophenone and triazine type UV absorbers.

Other suitable UV absorbers or stabilizers such as resorcinol monobenzoate, 2-hydroxy-4-octyloxy benzophenone and other benzophenone type absorbers, 2-(2'-hydroxy-5'-toctyl-phenyl) benzotriazole and other benzotriazole type absorbers, 2-hydroxy-4-octyloxy phenyl-diaryl triazines and other triazine type absorbers. Preferred triazine uv-absorber is Tinuvin®-400 from Ciba-Geogy Corp.

Reagent E is at least one hindered amine light stabilizer, which can be a hindered piperidyl ester of the formula

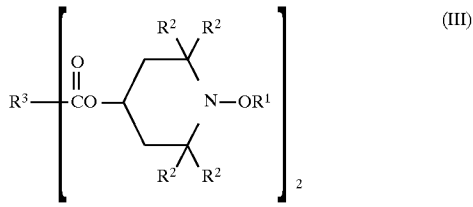

which also can be characterized as a cyclic hindered amino ether derivative. In said formula, $R^1$ is $C_{4-12}$ alkyl and most often primary alkyl, illustrated by n-butyl, n-pentyl, n-hexyl and n-decyl. The $R^2$ radical is $C_{1-4}$ primary alkyl illustrated by methyl, ethyl, n-propyl or n-butyl, with methyl being preferred. $R^3$ is a $C_{4-12}$ alkylene radical such as hexamethylene, octamethylene or decamethylene, with octacmethylene being preferred. The compound of formula III wherein $R^1$ is n-octyl, each $R^2$ is methyl and $R^3$ is octamethylene has the IUPAC name bis(1-octyloxy-2,2,6,6-tetramethyl-4-piperidinyl) sebacate and is commercially available under the designation "Tinuvin 123" (Ciba-Geigy Corp.).

Reagent F is at least one acrylic functional siloxane which are prepared using dimethyl polysiloxane having viscosity ranging from 1 to 1000 centipoise.

One of the schemes to prepare acrylic functional polysiloxanes from dimethyl polysiloxane having different functionality, ester content and molecular weights is described in Journal of Polymer Science, Part A, Vol. 30, 2755–2764 (1992), incorporated herein by reference.

A preferred acrylic functional siloxane for this invention is an acrylic functional, polyester modified dimethylpolysiloxane, which is commercially available as Byk-371® a product of BYK-Chemie USA. It is available as 37–43% non-volatile matter in xylene solvent. Viscosity is 80–100 centistokes at 75° F., while density of the material is 0.92–0.96 gms./c.c. at 68° F.

In general, the compositions of this invention contain about 50–90 weight percent acrylic monomer. Reagent B is silica acrylate which comprises 5–40 weight percent.

Reagent C, the photoinitiator, generally comprises about 0.5–5.0 weight percent, and reagent D, the ultraviolet absorber, is most often employed in the amount of about 1–20 percent. The reagent E, the hindered amine, is about 0.1–4.0 weight percent of the composition. The concentration of reagent F ranges from about 0.1 to 2.0 parts by weight per hundred parts of acrylic monomers (phr).

The compositions of this invention may be prepared by simply blending the various reagents in the desired proportions. If solvents are present and/or colloidal silica is the source of reagent B, volatiles may be removed by conventional operations such as vacuum stripping. The composition may then be applied by conventional techniques such as dipping, brushing, roller coating or flow coating to the substrate, which is most often a polycarbonate, polyester or an acrylic resin such as poly(methyl methacrylate). The coating thus formed preferably has a thickness in the range of about 3–25 and typically about 10 microns.

Following application, the composition is cured in air by exposure to suitable radiation, typically ultraviolet radiation. Curing temperatures are not critical but may be within the range of about 25°–70° C. It is often convenient to employ a continuous line for coating and curing. Resinous articles coated with the compositions of this invention, as well as the during products thereof, are other aspects of the invention.

The invention is illustrated by a series of examples in which ultraviolet light curable coating compositions were based on a number of multifunctional acrylic monomers such as dipentaerythritol monohydroxypenta acrylate, hexafunctional polyurethane, and hexafunctional polyester acrylate. These polyfunctional acrylic monomers were mixed with up to 50 weight percent silyl acrylate modified colloidal silica in hexaneodiol diacrylate monomer. The viscosity of the compositions was adjusted by diluting with either monoacrylates as reactive dilutents or solvents or both.

Other important components of the compositions having improved moisture resistance were light stabilizers including UV absorbers and hindered amine light stabilizers. The compositions used 2,4,6-trimethylbenzoyldiphenylphosphine oxide (Lucirin® TPO, BASF Corp.) as a photo initiator. In addition, the compositions were diluted with a solvent mixture of isopropanol and propylene glycol methyl ether to apply coating compositions using a flow coating technique. The basic abrasion resistant and weatherable coating compositions 1, 2, 3, 4, and 5 are summarized in Table I.

TABLE I

COATING COMPOSITIONS (ALL PARTS BY WEIGHT)

| REAGENT CHEMICAL | 1 | 2 | 3 | 4 | 5 |
|---|---|---|---|---|---|
| Reagent A | | | | | |
| dipentaerythritol monohydroxy-penta acrylate | 7.09 | — | — | — | — |
| polyurethane hexaacrylate | — | 7.5 | — | 7.5 | 8.0 |
| polyester hexaacrylate | — | 8 | — | — | — |
| Reagent B | | | | | |
| silica acrylate | 2.09 | 2.0 | — | — | 2.0 |
| Reagent C | | | | | |
| 2,4,6 trimethylbenzoyl-diphenyl phosphine oxide | 0.3 | 0.3 | 0.3 | 0.3 | 0.3 |
| Reagent D | | | | | |
| benzotriazole UVA | — | 0.4 | 0.2 | 0.3 | — |
| benzophenone UVA | 0.6 | 0.1 | 0.2 | — | — |
| 2-hydroxy-4 acryloxyethoxy benzophenone UVA | 0.3 | — | — | 0.3 | — |
| triazine UVA (Tinuvin® 400) | — | — | — | — | 0.6 |
| Reagent E | | | | | |
| hindered amine light stabilizer (Tinuvin® 770) | — | 0.1 | 0.1 | — | — |
| hindered amine light stabilizer (Tinuvin® 123) | — | — | — | 0.1 | — |
| hindered amine light stabilizer (Tinuvin® 144) | — | — | — | — | 0.1 |
| Reactive dilutents | | | | | |
| hexanediol diacrylate | — | — | 1.0 | — | — |
| octyl-decyl acrylate | 0.82 | 0.5 | — | 2.5 | — |
| isobornyl acrylate | — | — | 1.0 | — | — |
| Solvents | | | | | |
| isopropanol/propylene glycol methyl ether (25:75) | 30 | — | — | — | — |
| isopropanol/propylene glycol methyl ether (50:50) | — | 20 | 20 | 20 | 20 |

The above mentioned compositions in Table I were modified with low surface energy additives such as silicone polyether copolymers, di-, tri-, and hexafunctional silicone acrylates and a fluorinated acrylic monomer to prepare the coating compositions of this invention.

In the first examples, the UV-cured coating systems were based on dipentaerythritol monohydroxypenta acrylate as a multifunctionalmonomer and composition 1 was mixed with an unreactive silicone polyether additive and an acrylated trifunctional polyester modified dimethylpolysiloxane at 0.5 phr level based on acrylic monomers and colloidal silica. These compositions were flow coated on the 4 inch by 6 inch by ⅛ inch polycarbonate substrate panel, subsequently air dried for one minute and dried in a convection oven for 2 minutes at 60° C. to remove any solvents. The coating was then cured using a UV processor equipped with two 300 watts/inch medium pressure mercury lamps by passing the coated panels under the UV light six times at a conveyor belt speed of 25 feet per minute in an air atmosphere under ambient conditions.

Surface energy of the coating was determined by measuring static water contact angle ($\theta$) using a goniometer. Coating samples were then immersed in a hot water bath maintained at 65°±2° C. and contact angle $\theta$ measurements were done periodically to determine the hydrophobic/hydrophilic mature of the surface and its moisture resistance and durability. For practical purposes, $\theta > 90°$ is highly preferred.

Coating compositions containing an unreactive silicone polyether additive and an acrylated trifunctional polyester modified dimethylpolysiloxane had low surface energy having contact angles of 92° and 95° respectively. However, the coating containing unreactive silicone polyether additive showed poor moisture resistance and the contact angle dropped to 66° after only 4 hours of a water soak (WST) at 65° C. The low surface energy of the coating containing the acrylated trifunctional polyester modified dimethylpolysiloxane was found to be much more durable and the water contact angle dropped only slightly to 87° after 2 days of a water soak test (WST) at 65° C.

In other examples, a variety of low surface energy additives were evaluated using the UV-curable composition 2 shown in Table I based on a hexafunctional polyurethane matrix. The concentration of the low surface energy additives was varied from 0.1 to 1.0 phr concentration levels. The low surface energy additives having different physical and chemical characteristics included: trifunctional acrylated siloxane, silicone polyether copolymers, hexafunctional acrylated siloxane, difunctional acrylated siloxane, and a fluoroacrylate monomer. Coating sample preparation was as described above, except that the drying was at 65° C. rather than 60° C. The initial water contact angle measurements and contact angles after the water soak test at 65° C. are summarized in Table II. The coating composition without any low surface energy additive showed an initial contact angle of 62° which dropped to 56° after 7 days of water soak testing at 65° C. The results in Table II show that the trifunctional acrylated siloxane provides high contact angles ($\theta$>90°) and low surface energy. The desirable surface characteristic was significantly better in its moisture resistance as shown by very little change in the contact angle after 7 days of water soak testing at 65° C. Other additives as shown in Table II were also effective in lowering the surface energy and increasing the moisture resistance as shown by the initial contact angle measurements. Some of these coatings did demonstrate a drop in the contact angles after only 1 day of water soak testing at 65° C.

TABLE II

WATER CONTACT ANGLE ($\theta$) MEASUREMENTS
ADDITIVES WITH COMPOSITION 2

| ADDITIVE | AMOUNT (phr) | INITIAL $\theta$degrees | $\theta$*AFTER WST AT 65° C. | | | |
|---|---|---|---|---|---|---|
| | | | 1 day | 2 days | 4 days | 7 days |
| BYK ®-371 (1) | 1.0 | 92 | 91 | 90 | 91 | 89 |
| | 0.5 | 92 | 91 | 90 | 90 | 87 |
| | 0.1 | 93 | 92 | — | 87 | 85 |
| BYK ®-300 (2) | 1.0 | 80 | 74 | 72 | 75 | 73 |
| | 0.5 | 73 | 70 | 67 | 65 | 63 |
| | 0.1 | 90 | 76 | — | 69 | 61 |
| BYK ®-331 (3) | 0.1 | 85 | 68 | — | 51 | 55 |
| Ebecryl ® 1360 (4) | 0.5 | 87 | 74 | 70 | 67 | 62 |
| Ebecryl ® 350 (5) | 0.5 | 94 | 75 | 73 | — | 65 |
| FX-189 ® (6) | 0.5 | 75 | 63 | 63 | — | 63 |
| None | — | 62 | 61 | 61 | — | 56 |

*Coated sample (3" x 4") taken out of hot water bath - washed with deionized water-surface dried by blowing compressed air and wiped clean with Kimwipes ® EX-L (Kimberly-Clark) - measurement finished within 1–2 minutes
(1) BYK-371. Acrylic trifunctional, polyester modified dimethylpolysiloxane, BYK-Chemie
(2) BYK-300. Polyether modified dimethyl polysiloxane copolymer. BYK-Chemie
(3) BYK-331. Polyether modified dimethylpolysiloxane copolymer. BYK-Chemie
(4) Ebecryl 1360. Silicone hexacrylate. UCB Radcure Inc.
(5) Ebecryl 350. Difunctional Acrylated silicone. UCB Radcure Inc.
(6) FX-189. Fluorochemical acrylate. 2-N-butylperfluorooctane-sulfonamidoethyl acrylate isomers, 3M Co.

Trifunctional acrylated siloxane was demonstrated in a number of different weather resistant compositions based on hexafunctional polyester acrylate and polyurethane acrylate in compositions 2, 3, 4, and 5, as listed in Table I. Coating composition 4 based on a mixture of polyurethane acrylate and octyl-decyl acrylate with 0.1 phr of the low surface energy additive, acrylated trifunctional polyester modified dimethylpolysiloxane, showed initial water contact angle of 93°, which was essentially unchanged to about 90° after 7 days of water soak testing at 65° C.

It is also possible to mix other additives with the acrylated trifunctional polyester modified dimethylpolysiloxane additive without affecting the desired coating properties. Composition 5 was mixed with acrylated trifunctional polyester modified dimethylpolysiloxane and hexafunctional acrylated siloxane. The coating showed initial $\theta$ of 93°, and 91° after 1 day of water soak testing at 65° C. The coating also exhibited good Taber abrasion resistance having % haze value of 19 after 300 cycles and no scratches observed when rubbed with a steel wool (#000) ten times back and forth.

Coating systems based on multifunctional acrylates were evaluated with and without colloidal silica using a Taber abrasion test according to ASTM D-1044, and the results are compiled in Table III. Use of colloidal silica in the coatings improved the abrasion resistance. For example, incorporation of 10 weight percent colloidal silica reduced percent haze by about 30 percent, while 20 percent silica loading gave about 50 percent reduction in % haze values.

TABLE III

TABER ABRASION RESISTANCE**
COATING COMPOSITIONS (ALL PARTS BY WEIGHT)

| REAGENT | 6 | 7 | 8 | 9 | 10 | 11 | 12 |
|---|---|---|---|---|---|---|---|
| Reagent A | | | | | | | |
| dipentaerythritol monohydroxypenta acrylate | 8 | 6 | — | — | — | — | — |
| polyurethane acrylate | — | — | 8 | 8 | 6 | — | — |
| polyester acrylate | — | — | — | — | — | 8 | 6 |
| hexanediol diacrylate | 2 | — | 2 | — | — | 2 | — |
| Reagent B | | | | | | | |
| silica acrylate wt. % silica | 0 | 4 20 | 0 | 2 10 | 4 20 | 0 | 4 20 |
| Reagent C | | | | | | | |
| 2,4,6 trimethyl-benzoyldiphenyl-phosphine oxide | 0.3 | 0.3 | 0.3 | 0.3 | 0.3 | 0.3 | 0.3 |
| Reagent D | | | | | | | |
| benzophenone type UVA | 0.3 | 0.3 | — | — | — | 0.3 | 0.3 |
| triazine type UVA | — | — | 0.35 | 0.35 | 0.35 | — | — |
| Reagent E | | | | | | | |
| hindered amine | 0.1 | 0.1 | 0.1 | 0.1 | 0.1 | — | — |
| Reagent F: acrylated trifunctional polyester modified dimethylpoly-siloxane | 0.05 | 0.05 | 0.05 | 0.05 | 0.05 | 0.05 | 0.05 |
| Solvent: isopropanol/propylene glycol (50:50) | 22 | 22 | 22 | 22 | 22 | 22 | 22 |
| Taber Abrasion Resistance, % Haze | 18.5 | 8.4 | 20.1 | 13.4 | 10 | 37.3 | 18.9 |

Abrasion resistance measured using Teledyne Taber instrument model 5150 equipped with two CS-10F abrasive wheels with 500 gram weight on each wheel for 300 cycles (ASTM D-1044).

The xenon arc accelerated weathering results of various coating systems listed in Tables I and III are summarized in Table IV. Depending on the type and level of UV-absorber, all coatings showed excellent weathering performance. The coatings survived about 2200 to 3500 hours in the accelerated test without any significant loss of optical properties or high degree of yellowing and spontaneous delamination.

TABLE IV

Xenon Arc* Weathering Results
% Transmission/Yellowness Index/% Haze

| Exposure Kj/m² (hours) | 2 | 4 | 5 | 8 |
|---|---|---|---|---|
| 0 | 90.1/1.1/0.1 | 90.4/0.9/0.2 | 89.8/1.4/0.5 | 90.3/0.9/0.1 |
| 1594 (648) | 90.5/0.8/0.8 | 90.6/0.7/2.2 | 89.8/0.8/1.2 | 90.3/0.5/0.9 |
| 3188 (1296) | 90.7/0.7/3.3 | 90.4/1.2/3.0 | 90.4/0.6/0.3 | 90.5/0.9/2.4 |
| 4782 (1944) | 89.6/1.1/3.5 | 88.3/3.6/3.3 | 90.8/0.9/3.2 | 90.2/2.1/2.8 |
| 5579 (2268) | 90.3/2.3/5.5 | Delamination | 90.9/1.2/3.5 | 89.8/3.2/4.4 |
| 6376 (2592) | Delamination | — | — | 89.0/4.7/6.2 (Partly Delaminated) |
| 7173 (2916) | — | — | 88.6/2.3/6.9 | — |
| 7970 (3243) | — | — | 83.5/4.1/20.9 | — |
| 8767 (3563) | — | — | Delamination | — |

*Atlas Ci35a Xenon Arc Weather-Ometer ®
Type S borosilicate inner and outer filters
Irradiance level 0.77 w/m² at 340 nm, black panel temperature 70–73° C., dry bulb temperature 45° C., 50% RH.
The cycle is 60 minutes light, 5 minutes dark, 15 minutes dark with water spray.
% transmission/yellowness index/% haze values measured using Pacific Scientific XL-835 colorimeter.

What is claimed:

1. A composition which provides moisture resistance, comprising the following components at the designated quantities: (A) about 50–90 weight % of a polyfunctional acrylate, (B) about 5–40 weight % silica acrylate, (C) about 0.5–5.0 weight % of at least one initiator for ultraviolet radiation-induced curing of said composition, (D) about 1–10 weight % of at least one ultraviolet light absorber, (E) about 0.1–4.0 weight % of at least one hindered amine light stabilizer, wherein the quantity of each of said components is based on the total weight of the composition; and (F) about 0.1 to 2.0 parts by weight, per hundred parts of acrylic monomers (phr), of an acrylic functional polyester modified dimethypolysiloxane, to provide a surface energy of said composition having a contact angle of water greater than about 80°.

2. A composition according to claim 1 wherein reagent A further comprises a silyl acrylate.

3. A composition according to claim 2 wherein the silyl acrylate has the formula

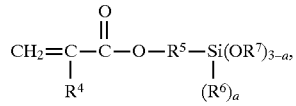

wherein $R^4$ is hydrogen or methyl, $R^5$ is $C_{1-8}$ alkylene, $R^6$ is $C_{1-13}$ alkyl or aryl, $R^7$ is $C_{1-8}$ alkyl, and a is from 0 to 3.

4. A composition according to claim 2 wherein the polyfunctional acrylate has the formula

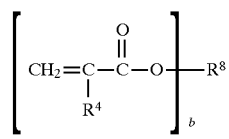

wherein $R^4$ is hydrogen or methyl, $R^8$ is an organic radical having a valence from 2 to 6, and b is an integer from 2 to 6.

5. A composition according to claim 1 wherein reagent B has an average particle size in the range of about 15–30 nm.

6. A composition according to claim 1 wherein reagent C is selected from combinations of an aromatic ketone, a tertiary amine; or acylphosphorous compounds.

7. A composition according to claim 6 wherein the acylphosphorous compound is 2,4,6-trimethylbenzoyldiphenylphosphine oxide.

8. A composition according to claim 1 wherein the ultraviolet light absorber is a benzotriazole or triazine.

9. A composition according to claim 1 where the hindered amine light stabilizer has the formula

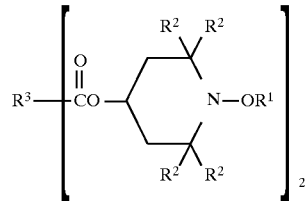

wherein $R^1$ is $C_{4-12}$ alkyl, $R^2$ is $C_{1-4}$ normal alkyl and $R^3$ is $C_{4-12}$ alkylene.

10. A composition according to claim 1 wherein reagent F is an acrylated trifunctional polyester modified dimethylpolysiloxane.

11. An ultraviolet-curable coating composition with moisture resistance, comprising the following components at the designated quantities: about 5–40 weight % silica acrylate, about 50–90 weight % hexafunctional polyurethane acrylate, silica having an average particle size in the range of about 15–30 nm where said silica is silane functionalized colloidal silica in hexane diol diacrylate, about 0.5–5.0 weight % 2,4,6-trimethylbenzoyltriphenylphosphine oxide, about 1–10 weight % triazine UV absorber, about 0.1–4.0 weight % hindered amine light stabilizer, wherein the quantity of each of said components is based on the total weight of the composition; and about 0.1–1.0 parts by weight per hundred parts of acrylic monomers of acrylic trifunctional polyester modified dimethylpolysiloxane, where said coating is diluted with an alcohol or a glycol ether type solvent or mixtures thereof.

* * * * *

UNITED STATES PATENT AND TRADEMARK OFFICE
CERTIFICATE OF CORRECTION

PATENT NO. : 5,811,472

DATED : September 22, 1998

INVENTOR(S) : Gautam A. Patel

It is certified that error appears in the above-identified patent and that said Letters Patent is hereby corrected as shown below:

Column 5, line 58, in the Table under Column heading 2, cancel "8".

Column 5, line 58, in the Table under Column heading 3, insert --8--.

Signed and Sealed this

Second Day of February, 1999

Attest:

Attesting Officer

Acting Commissioner of Patents and Trademarks